Nov. 13, 1951 R. R. LEVEN 2,574,572
CONSTRUCTION FOR CONNECTING WIRE MEMBERS TOGETHER AND
METHOD OF PRODUCING AND ASSEMBLING THE SAME
Filed May 10, 1947 2 SHEETS—SHEET 1
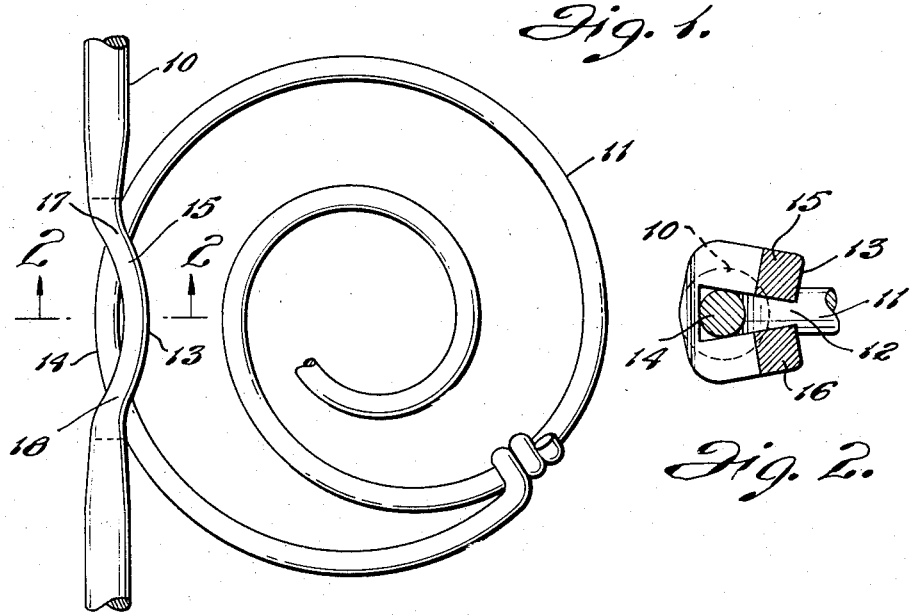
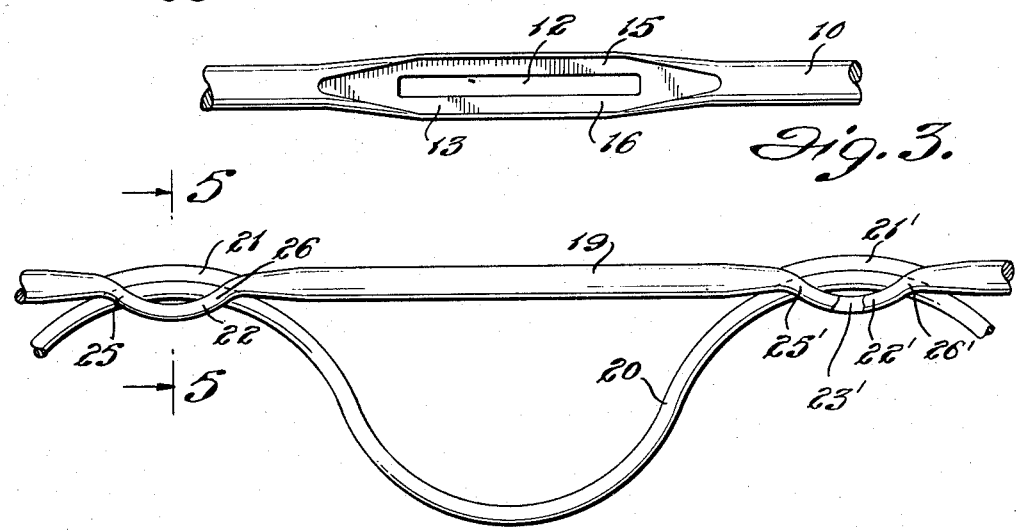
INVENTOR.
RICHARD R. LEVEN
BY Clark & Ott
ATTORNEYS Nov. 13, 1951     R. R. LEVEN     2,574,572
CONSTRUCTION FOR CONNECTING WIRE MEMBERS TOGETHER AND
METHOD OF PRODUCING AND ASSEMBLING THE SAME
Filed May 10, 1947     2 SHEETS—SHEET 2

INVENTOR.
RICHARD R. LEVEN
BY Clark & Ott
ATTORNEYS

Patented Nov. 13, 1951

2,574,572

UNITED STATES PATENT OFFICE 2,574,572

CONSTRUCTION FOR CONNECTING WIRE MEMBERS TOGETHER AND METHOD OF PRODUCING AND ASSEMBLING THE SAME

Richard R. Leven, New York, N. Y., assignor to The Englander Company, Inc., Chicago, Ill., a corporation of Delaware Application May 10, 1947, Serial No. 747,188

6 Claims. (Cl. 287—77)

1

This invention relates to an improved construction for connecting together rods, wires and the like of relatively different sizes and to a method of producing and assembling the same. Although not limited thereto, the invention has particular reference to a method of and construction for connecting wire members of spring frames together.

The invention has for an object the provision of a construction in which a portion of the smaller member is located within an offset longitudinally slotted portion of the larger member and is secured therein by inwardly bending the opposite sides of the offset portion to constrict the slot.

The invention has for a further object the provision of a construction of said character in which the smaller member protrudes through the offset longitudinally slotted portion of the larger member and is engaged thereby at spaced locations with the innermost slotted portion of the larger member being compressed together for securing the members together.

Another object of the invention is the provision of the larger member being slitted to provide a medial portion and oppositely disposed side portions, which side portions are offset to form a recess therebetween through which a portion of the smaller member protrudes into engagement with the medial portion thereof and with the inwardly offset side portions compressed together to secure the smaller member within the recess.

A further object of the invention is the provision of a method of producing and assembling the wire members which consists in longitudinally slitting a portion of the larger member to provide opposite side portions arranged in spaced relation to form a recess therebetween, offsetting said side portions, disposing a portion of the smaller member in said recess and compressing said offset side portions together to constrict the recess and secure the smaller member therein.

With the foregoing and other objects in view, reference is now made to the following specification and accompanying drawings in which the preferred embodiments of the invention are illustrated.

In the drawings:

Fig. 1 is a plan view of a portion of two wire members constructed in accordance with the invention for securing the same together.

Fig. 2 is a sectional view taken approximately on line 2—2 of Fig. 1.

2

Fig. 3 is a longitudinal view of one of the spring members showing the slitted formation thereof.

Fig. 4 is a plan view of a portion of two wire members illustrating a modification of the invention for securing the same together.

Figure 5:
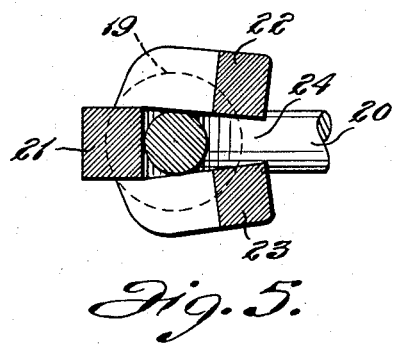

Fig. 5 is a sectional view taken approximately on line 5—5 of Fig. 4.

Figure 6:
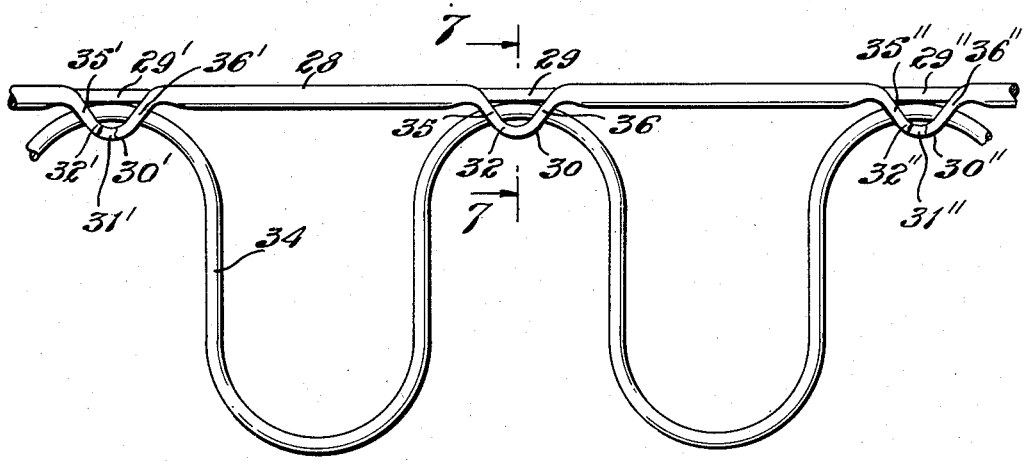

Fig. 6 is a plan view of two wire members illustrating still another modified form of the invention for securing the same together.

Figure 7:
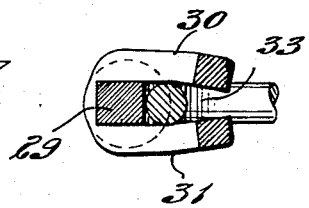

Fig. 7 is a sectional view taken approximately on line 7—7 of Fig. 6.

Referring to the drawings by characters of reference and more particularly to the form of the invention illustrated in Figures 1 to 3 of the drawings, the construction consists of two wire members 10 and 11 of any desired cross-sectional configuration and which as illustrated are of circular cross-sectional formation. The member 10 may be a longitudinally or transversely extending connecting wire of an innerspring frame and the like such as a border or intermediate wire for connecting the springs such as coil spring members 11 together in unit formation.

The member 10 is slotted longitudinally of the medial line thereof so as to form a rectangular slot 12 opening through the opposite sides thereof. The member 10 is offset in the region of the slot 12 to one side of the longitudinal axis of said member so as to form a bowed portion 13 which merges with the straight portions of the member adjacent the ends of the slot 12. In producing the offset or bowed portion 13 the same is somewhat flattened or reduced in thickness in one dimension with an increase in width in the opposite dimension. By this formation the strength of the member 10 in the offset portion 13 has not been diminished and its resistance to bending has been increased.

The coil spring member 11 is adapted to be affixed to the wire member 10 by engagement of an arcuate portion 14 of one of the convolutions of said spring member in protruding relation in said slot 12 with the main body of the coil spring located on one side of the wire member 10. When thus disposed the arcuate portoin 14 is engaged at spaced locations 17 and 18 adjacent the ends of the slot 12 by the side walls 15 and 16 thereof with the said arcuate portion 14 and the offset portion 13 between said locations of engagement 17 and 18 being curved in opposite directions.

The opposite side walls 15 and 16 between said locations of engagement 17 and 18 are compressed inwardly so as to constrict the slot 12 to thereby secure the arcuate portion 14 within the slot and connect the said wire members together. This provides a secure connection since a portion of the member 11 protrudes through the slot 12 in the wire member 10 and the opposite side walls 15 and 16 of said slot being offset in the opposite direction permits of the compressing of the side walls 15 and 16 as desired so as to constrict the medial portion of said slot and retain the arcuate portion 14 within the slot.

In the form of the invention illustrated in Figures 4 and 5 of the drawings, two wire members 19 and 20 are connected together at spaced intervals by means of an offset slotted construction similar to that described in connection with the previous form of the invention. The wire member 19 may be a longitudinally or a transversely extending connecting wire of an innerspring frame and the like and as such the same is relatively larger in cross-sectional area than the wire member 20 which as illustrated is of undulating formation.

In this form of the invention a portion of the wire member 19 is longitudinally slitted in transversely spaced relation so as to form a medial portion 21 and opposite side portions 22 and 23. The opposite side portions 22 and 23 are offset to one side of the longitudinal axis of the wire member 19 into bowed or arcuate formation so as to form a slot 24 between said side portions which become the opposite side walls of the slot while the medial portion 21 is offset slightly in bowed or arcuate formation in the opposite direction.

The wire member 20 is arranged with an arcuate portion thereof disposed in protruding relation in the slot 24 in said wire member 19 and in engagement with the opposite side walls 22 and 23 thereof at spaced locations 25 and 26 with a portion of the wire member 20 between said spaced locations extending through the slot 24 and into abutting engagement with the medial portion 21. The opposite side walls 22 and 23 between said locations of engagement 25 and 26 are compressed together so as to constrict the slot 24 for connecting the members 19 and 20 together in a manner similar to that described in connection with the previous form of the invention.

When the wire member 20 is of undulating formation as illustrated, the same may be connected with the wire member 19 at a longitudinally spaced location from the aforesaid connection by longitudinally slitting the wire member 19 so as to form a medial portion 21' and opposite side portions 22' and 23' similar to the construction heretofore described. The opposite side portions 22' and 23' are similarly offset to one side of the longitudinal axis of the wire member 19 into bowed formation so as to form a slot between said side portions 22' and 23' similar to the slot 24 hereinbefore described and into which an arcuate portion of the wire member 20 is disposed and is engaged with the opposite side walls 22' and 23' at spaced locations 25' and 26' between which locations the opposite side walls 22' and 23' are compressed together so as to constrict the slot for securing the wire members 19 and 20 together.

The wire members may also be connected together as illustrated in Figures 6 and 7 of the drawings in which the longitudinally extending wire member 28 is longitudinally slitted so as to provide a longitudinally extending medial portion 29 and longitudinally extending opposite side portions 30 and 31 which are offset to one side of the longitudinal axis of said member forming a bowed or arcuate portion 32. The offsetting of the opposite longitudinally extending portions 30 and 31 provide a slot 33 between the said side portions which become the opposite side walls of the slot. In this form of the invention the medial portion 29 is disposed in the plane of the wire member and the center line thereof is located substantially concentric with the longitudinal axis of the member. The wire member 34 has an arcuate portion thereof extending into the slot 33 and is engaged by the opposite side wall portions 30 and 31 thereof at spaced locations 35 and 36 adjacent the ends of the slot with the portion of the wire member 34 between said spaced locations extending through said slot and into abutting relation with the medial portion 29. The opposite side walls 30 and 31 between said locations 35 and 36 are compressed together as in the previous forms of the invention so as to constrict the slot 33 medially of its length to thereby retain the member 34 in engagement therein and connect the members together.

As illustrated, the wire member 34 may be secured to the wire member 28 at longitudinally spaced points from the aforesaid connection by similarly slitting the wire member 28 so as to form longitudinally extending medial portions 29' and 29'' at said locations respectively and longitudinally extending side portions 30' and 31', and 30'' and 31'' respectively. Said side portions are offset to one side of the longitudinal axis of said wire member 28 forming bowed or arcuate portions 32' and 32'' and providing a slot therebetween similar to the slot 33 in the construction hereinbefore described and shown in Figure 7 of the drawings. The wire member 34 extends into said slots between said side portions and is secured therein by compressing the side portions 30' and 31' together and the side portions 30'' and 31'' together to constrict the slots therebetween similarly to the construction hereinbefore described.

The wire members in the forms of construction illustrated in the drawings are thus connected together by a method consisting in slitting a longitudinal portion of the larger member to provide opposite side portions arranged in spaced relation, offsetting said side portions to one side of the longitudinal axis of the wire member so as to form a slot therebetween in offset relation with the axis of said member, disposing a portion of the smaller wire member in said slot and compressing the side wall portions of the slot together to constrict the slot medially of its length so as to secure said portion of the smaller member within the slot and connect said members together.

Innerspring frames and the like produced by connecting wire members together in accordance with the invention may be employed as spring units in mattresses, sofas, chairs and the like and for all kinds of upholstery.

This construction permits of the securement of the wire members together with any desired degree of tightness whereby the same may be rigidly secured together or may be secured together to permit of swinging movement of one member with reference to the other.

What is claimed is:

1. A method of producing and connecting wire members together of relative different sizes consisting in slitting a longitudinal portion of the larger member in transversely spaced relation to provide a longitudinally extending medial portion and opposite side portions, disposing said opposite side portions in offset bowed formation to one side of the longitudinal axis of the wire member so as to form a slot therebetween in offset relation with the axis of said member, disposing a portion of the smaller member in protruding relation through said slot and in engagement with said opposite side portions at spaced locations and compressing said opposite side portions together intermediate said spaced locations to constrict the slot to thereby secure said portion of the smaller wire within the slot and connect the members together.

2. In a construction for connecting together two wire members of relatively different sizes, one of said wire members having oppositely disposed longitudinally extending side portions disposed in spaced apart relation and offset to one side of the longitudinal axis of said member to thereby form a longitudinally extending slot between said side portions, the other of said wire members being of relatively smaller size than said first mentioned wire member and having a portion thereof located in protruding relation in said slot and in engagement with the oppositely disposed side portions of the first named wire member at longitudinally spaced locations and said oppositely disposed side portions of the first named wire member being compressed to constrict said slot medially between said spaced locations for securing the smaller wire member in said slot.

3. In a construction for connecting together two wire members of relatively different sizes, one of said wire members having oppositely disposed longitudinally extending side portions disposed in spaced apart relation and offset in bowed formation to one side of the longitudinal axis of said member to thereby form a longitudinally extending slot between said side portions in offset relation to the axis of the member, the other of said wire members being of relatively smaller size than the first mentioned wire member and having a bowed portion thereof located in said slot in protruding relation through the opposite sides thereof and in engagement with the oppositely disposed side portions of the first named wire member at longitudinally spaced locations and said oppositely disposed side portions of the first named wire member being compressed to constrict said slot medially between said spaced locations for securing the smaller wire member in said slot.

4. In a construction for connecting together two wire members of relatively different sizes, one of said wire members being longitudinally slitted to provide a longitudinally extending medial portion and oppositely disposed longitudinally extending side portions, said side portions being offset in bowed formation to one side of the longitudinal axis of said member to thereby form a longitudinally extending slot between said side portions in offset relation to the longitudinal axis of the said member, the other of said wire members being of relatively smaller size than said first mentioned wire member and having a bowed portion thereof located in said slot in protruding relation through the opposite sides thereof with the said bowed portion disposed against medial portion of the first mentioned wire member and in engagement with the opposite side portions thereof at longitudinally spaced locations and said oppositely disposed side portions being compressed towards each other to constrict said slot medially of its length for securing the smaller wire member in said slot.

5. In a construction for connecting two wire members together, one of said wire members having a longitudinally extending slot opening through the opposite sides thereof and providing longitudinally extending side portions disposed in spaced apart relation, said side portions of said slot being offset in bowed formation to one side of the longitudinal axis of said member, the other said wire member having a portion thereof located in said slot and in engagement with the oppositely disposed side portions of the first named wire member at longitudinally spaced locations and said oppositely disposed side portions of the first named wire member being compressed towards each other to constrict said slot medially between said spaced locations for securing said wire members together.

6. In a construction for connecting two wire members together, one of said wire members being longitudinally slitted to provide a longitudinally extending medial portion and oppositely disposed longitudinally extending side portions, said side portions being offset in bowed formation to one side of the longitudinal axis of said member to thereby form a longitudinally extending slot between said side portions in offset relation to the longitudinal axis of said member, the other of said wire members having a portion thereof located in said slot in protruding relation through the opposite sides thereof with the said last mentioned wire member being disposed against said medial portion of the first mentioned wire member and in engagement with the opposite side portions thereof at longitudinally spaced locations and said oppositely disposed side portions being compressed towards each other to constrict said slot medially of its length for securing the wire members together.

RICHARD R. LEVEN.

REFERENCES CITED

The following references are of record in the file of this patent:

UNITED STATES PATENTS

| Number | Name | Date |
|---|---|---|
| 345,655 | Wood | Jan. 13, 1886 |
| 355,747 | Wood | Jan. 11, 1887 |
| 387,447 | Reddick | Aug. 7, 1888 |
| 1,539,940 | Gaschke | June 2, 1925 |
| 1,706,854 | Kroczek | Mar. 26, 1929 |
| 1,776,874 | Weston | Sept. 30, 1930 |
| 1,971,765 | Bouser | Aug. 28, 1934 |
| 2,017,039 | Carlson | Oct. 15, 1935 |
| 2,076,811 | Ehlers | Apr. 13, 1937 |
| 2,162,815 | Krueger | June 20, 1939 |
| 2,179,089 | Hauf | Nov. 7, 1939 |
| 2,375,996 | Kaufman et al. | May 15, 1945 |